July 22, 1969

B. G. HUBBARD 3,457,559

ELECTRONIC ANNUNCIATOR MEANS

Filed Nov. 26, 1965

INVENTOR:
BOBBY GENE HUBBARD
BY Charles B. Haverstock
ATTORNEY.

July 22, 1969

B. G. HUBBARD 3,457,559

ELECTRONIC ANNUNCIATOR MEANS

Filed Nov. 26, 1965

INVENTOR:
BOBBY GENE HUBBARD
BY Charles B. Haverstock
ATTORNEY.

United States Patent Office 3,457,559
Patented July 22, 1969

3,457,559
ELECTRONIC ANNUNCIATOR MEANS
Bobby Gene Hubbard, Cairo, Ill., assignor, by mesne assignments, to Warren L. Spielman, Pasadena Hills, Mo.
Filed Nov. 26, 1965, Ser. No. 509,835
Int. Cl. G08b 25/00
U.S. Cl. 340—213.1   6 Claims The present invention relates generally to annunciator means and more particularly to an electronic annunciator circuit employing solid state elements for monitoring and other purposes.

Many annunciator devices and circuits are in existence and are used for monitoring and other purposes. For the most part the known annunciators employ electromechanical devices and means which are relatively complicated, expensive and require frequent maintenance. The known devices are also relatively insensitive and unreliable under certain conditions and are subject to errors caused by transient and momentary conditions. For these and other reasons the known annunciators have enjoyed limited usage and are unsuitable for many applications and purposes.

The present invention teaches the construction and operation of novel annunciator means which overcome these and other limitations and shortcomings of the known devices. The subject annunciator means are preferably constructed using solid state elements including devices such as silicon controlled rectifiers (SCR's) and the like, and the subject annunciator means are extremely sensitive and reliable and yet are relatively insensitive to transient conditions which might produce false alarms and unnecessary trouble and maintenance. The subject annunciator also includes novel means for identifying the occurrences of the alarm conditions and novel means for acknowledging said occurrences.

It is therefore a principal object of the present invention to provide improved annunciator means.

Another object is to provide annunciator means that are relatively insensitive to transient conditions which might produce false alarms.

Another object is to provide relatively inexpensive, compact and trouble free annunciator means.

Another object is to provide a compartmentalized annunciator construction which facilitates repair and maintenance.

Another object is to provide novel electronic means capable of responding to and indicating the occurrences of predetermined conditions by giving warnings thereof.

Another object is to provide annunciator means that can be operated and understood by persons having relatively little skill and training.

Another object is to provide improved means for testing and trouble shooting multi-channel circuitry.

These and other objects and advantages of the present invention will become apparent after considering the following detailed specification which covers a preferred embodiment of the subject device in conjunction with the accompanying drawings, wherein.

Figure 1:
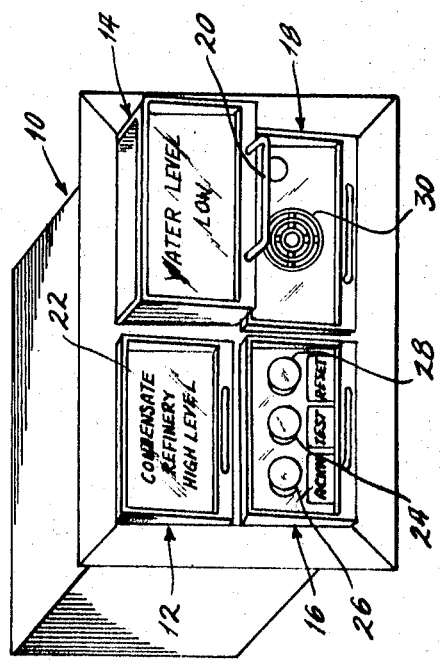
FIG. 1 is a perspective view of a housing for an annunciator circuit constructed according to the present invention.

Referring to the drawings more in detail, number 10, in FIG. 1, refers to a typical housing section for an annunciator circuit constructed according to the present invention. The housing 10 is constructed to receive a plurality of drawers 12, 14, 16 and 18 each of which can be individually pulled out of the housing 10 for repair or replacement purposes. Each drawer includes a portion of the annunciator circuit and each drawer has a handle 20 to facilitate its removal from the housing. When the drawers are installed in the housing 10, circuit connector means at the rear of the drawers cooperate with other connector means in the housing 10 to complete the circuit connections between the various drawers. The housing section 10 in FIG. 1, for illustrative purposes, is shown having four drawers although it is anticipated that many more drawers could be provided depending on the number of conditions to be monitored. The upper left drawer 12 in FIG. 1 contains part of the annunciator circuitry and has a translucent front panel 22 suitably marked to indicate a particular fault that is being monitored. Behind the translucent or transparent panel 22 are one or more light bulbs which when energized, as will be shown, give warning that a predetermined alarm condition exists. A similar translucent panel is mounted on the upper right drawer 14 which includes means to monitor a different condition. The lower left drawer 16 contains other control circuits and its front panel has three push-button switches mounted on it including a test switch 24, an acknowledge switch 26 and a reset switch 28. The purpose of the switches will be described more in detail hereinafter. The lower right drawer 18 also contains circuitry and its front panel has an audible device 30 mounted on it which is actuated in conjunction with all or any number of the warning lights to provide an audible warning. The audible device may be used simultaneously with many different monitoring circuits or channels or it may be used in place of lights. It is preferred, however, to use lights and an audible device.

Figure 3:
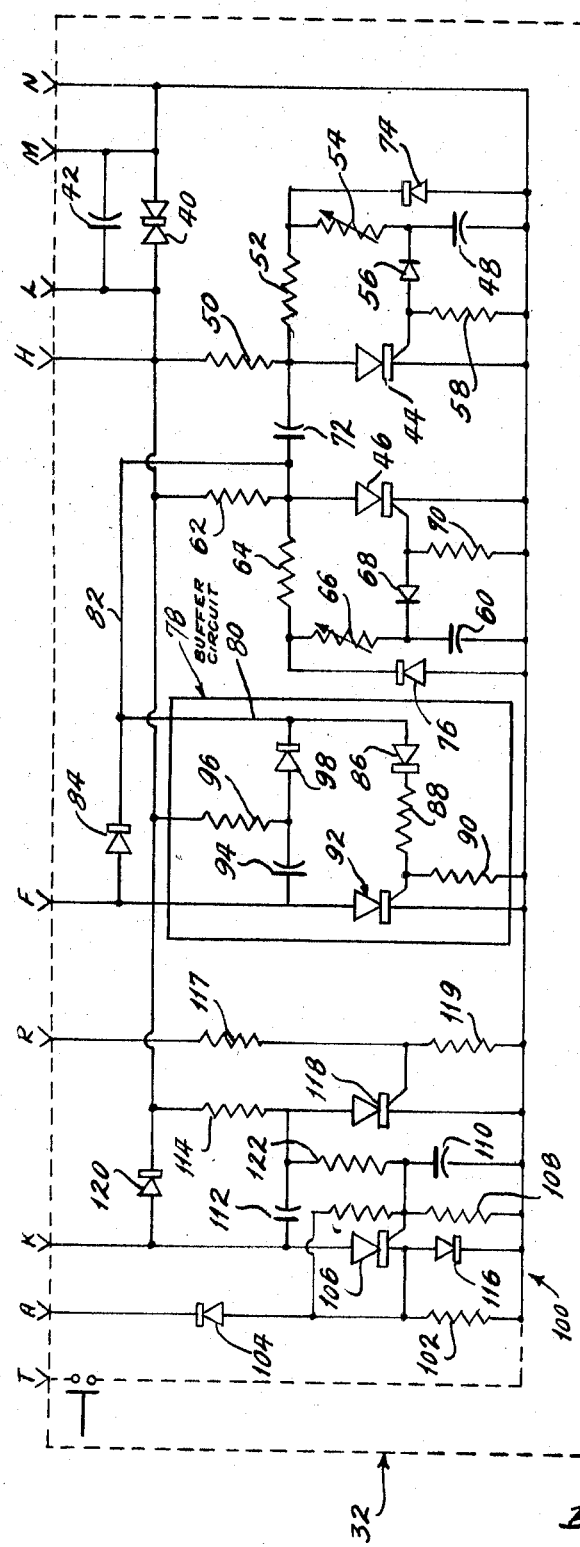
FIG. 3 is a schematic wiring diagram showing the details of a portion of the circuit shown in FIG. 2.
Figure 2:
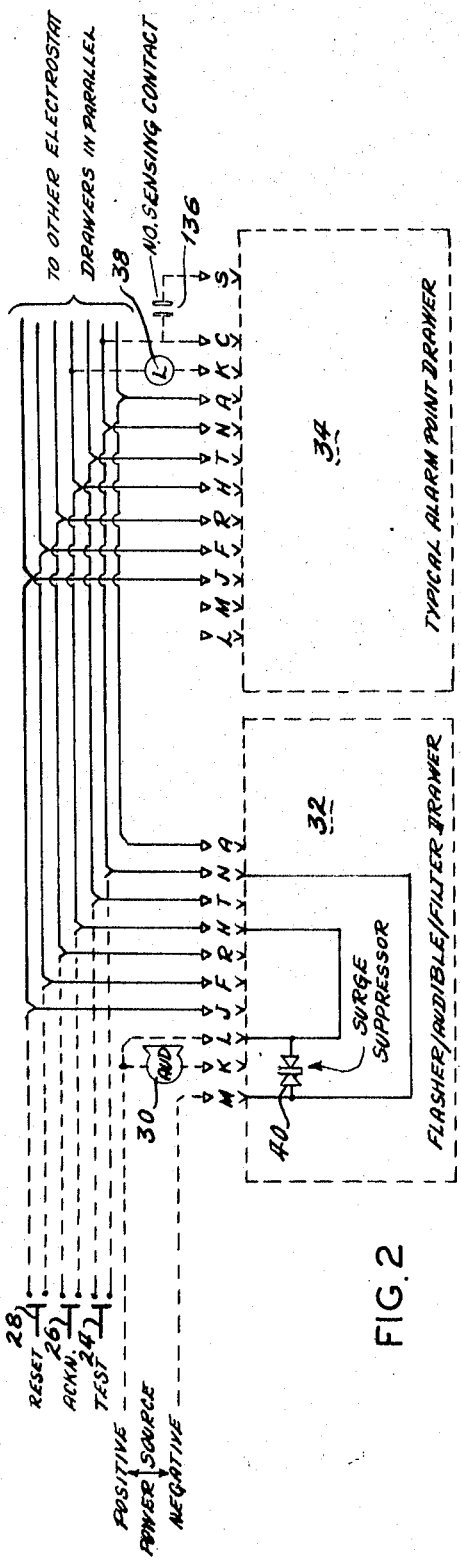
FIG. 2 is a schematic wiring diagram partly in block form of the subject annunciator circuit.
Figure 4:
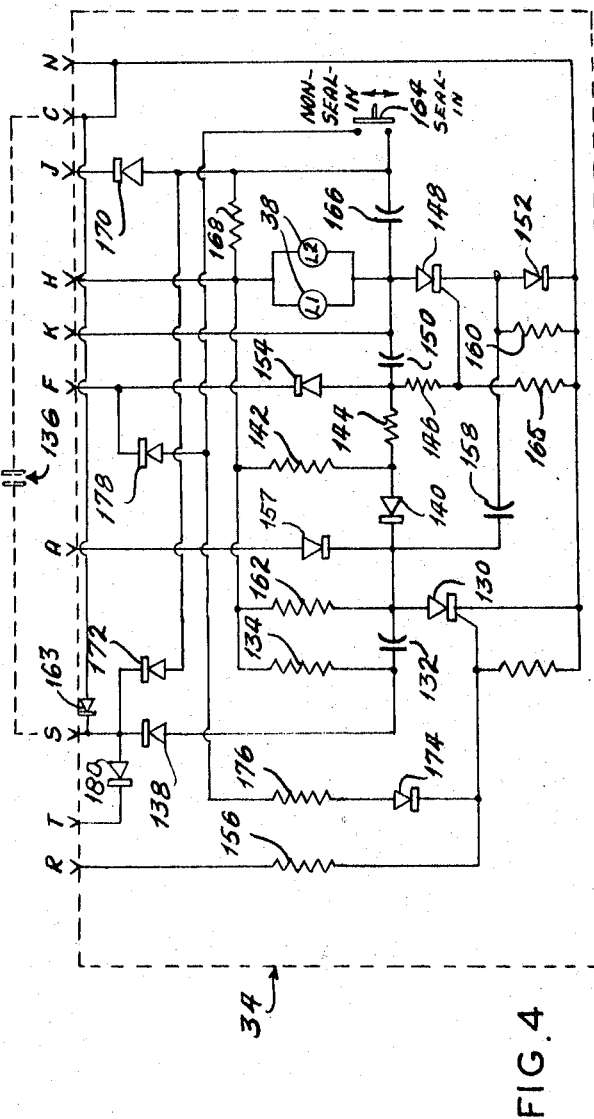
FIG. 4 is a schematic circuit diagram showing the details of another portion of the circuit shown in FIG. 2.

FIG. 2 shows the connections between the switches 24, 26 and 28 and the various control circuits included in the subject annunciator. It is to be noted, that the same three switches can be used to operate any number of similar annunciator control circuits such as those in the drawers 12, 14 and 18. For convenience in describing the structural and operational details of the subject annunciator, the circuit has been divided into two main portions, the first of which is identified by the number 32 in FIGS. 2 and 3, and the other by number 34 in FIGS. 2 and 4. The connections between the switch circuits in FIG. 2 and the circuits 32 and 34 in FIGS. 3 and 4 are identified by letters M, K, L, J, F, R, H, T, N, A, C and S. The connection K in the circuit 32 is the connection to the audible device or buzzer 30 while the K connection in the circuit 34 is the connection to the remote flasher lamps 38. The audible device 30 and the lamps 38 are preferably located in different drawers as indicated in FIG. 1 although they could also be in the same drawer or even located remotely. It may also be desirable to connect several lamps in parallel in each position for safety reasons and also to provide more light. Provision for a surge suppressor 40 in FIG. 2 is also provided to protect the device from external transients.

Connections C and S is FIGS. 2 and 4 are connected to sensing contacts which are normally open and are positioned and constructed to close in response to the occurrence of a predetermined condition or conditions being monitored such as a temperature or pressure condition, a position of a movable member, a radiation condition, or any of a number of other conditions. The sensing contacts can also be electrically or mechanically actuated contacts. Two wires are usually required for each set of sensing contacts, and the number of sets of sensing contacts depends on the number of conditions to be monitored.

The circuit 32 in FIG. 3 includes flasher control and other means for controlling the energizing of the bulbs 38 and the audible means or buzzer 30. The circuit 32 can be mounted in a single drawer, and in the particular embodiment disclosed this circuit is located in the drawer 18 with the push-button switches 24, 26 and 28. The power supplied to the circuit 32 is clipped and filtered by a circuit which includes the suppressor diode 40 and parallel connected capacitor 42.

One portion of the circuit shown in FIG. 3 is for flasher control and is provided to cause the light bulbs 38 to flash on and off at a predetermined rate whenever the sensing contacts for that circuit are actuated. The flasher control circuit is basically a flap-flop circuit preferably constructed mostly of solid state elements the principle of which include silicon controlled rectifiers (SCR's) 44 and 46. The flasher circuit is designed to operate continuously. The flasher control circuit is energized by power supplied between the circuit connections L and M and this power charges a capacitor 48 through a circuit which includes resistors 50, 52 and 54. When the charge on the capacitor 48 reaches a predetermined charge condition, a trigger diode 56, which has one side connected to the common connection between the resistor 54 and the capacitor 48 and its opposite side connected to the gate of the SCR 44, begins to conduct. When this happens a positive voltage is produced across another resistor 58 to cause the SCR 44 to conduct. As soon as the SCR 44 conducts capacitor 48 can no longer charge because at this time the voltage at the junction of resistors 50 and 52 drops to around zero volts. In other words, under the conditions described, the SCR 44 acts as a short circuit between the resistor 50 and the input common connection N.

At the same time that power is being supplied to the circuit 32 as aforesaid, another capacitor 60 is also charged through a carcuit which includes resistors 62, 64 and 66. When the voltage across the capacitor 60 reaches a predetermined voltage (similar to the predetermined voltage required of the capacitor 48) another trigger diode 68 will conduct and will cause a voltage to be produced across a resistor 70 producing a positive voltage on the gate electrode of SCR 46 causing it to conduct. When the SCR 46 conducts, the capacitor 60 can no longer charge because the voltage between the resistors 62 and 64, which is the same voltage as the voltage on the anode of the SCR 46, goes to zero.

Prior to the conduction of SCR 46 another capacitor 72 is charged through a circuit which includes the resistor 62 and the SCR 44. As soon as SCR 46 conducts, the capacitor 72 discharges through it and places a negative potential on the anode of the SCR 44 causing it to go from a conducting to a non-conducting state. When SCR 44 is in its non-conducting state, the voltage at the junction of resistors 50 and 52 goes positive and causes the capacitor 48 to again begin to charge until the voltage thereacross again reaches the predetermined voltage to cause the trigger diode 56 to conduct and cause the SCR 44 to go into its conducting state. The process described continues to repeat itself first to cause one of the SCR's to conduct and then the other. The rate at which this occurs can be adjusted by selecting and/or adjusting the values of the resistances of the various resistor elements. This can be done by using potentiometers for certain of the resistors such as the resistors 54 and 66. In an actual device it has been found that a flash rate of about 90 flashes per minute gives a good easily recognizable warning.

It can also be seen that the voltage at the anode of SCR 46 alternates between a zero voltage condition and a condition in which the anode voltage has predetermined positive value. In other words, the voltage on the anode of the SCR 46 is in the form of a square wave voltage which also appears on the connection F from which it is fed to each drawer having one or more lamps.

The potentiometers 54 and 66 (FIG. 3) are provided as aforesaid to adjust the flashing rate. In the particular embodiment shown the potentiometer 54 controls the "off" time of the flash lamps, and the potentiometer 66 controls the "on" or energized time of the flash lamps. The flash control circuits may also include Zener diodes 74 and 76 to maintain the charging voltages at the junctions of the resistors 52 and 54 and the resistors 64 and 66, respectively, at a constant voltage. This prevents line voltage variations from affecting the flash rate thereby improving the operating characteristics.

In some cases the load on the flash bulb connection F may also be so great that the charge on the capacitor 72 is insufficient to turn off the SCR 46. To correct this situation it may be necessary to provide a buffer circuit to increase the number of lamps that can be operated by a single control circuit. A typical buffer circuit is shown in block 78 (FIG. 3) and is connected by a lead 80 to another lead 82 which has one of its ends connected to the common connection between the capacitor 72 and the anode of the SCR 46. The lead 82 is also connected to a diode 84, which diode is included only when a buffer circuit is not needed. When the anode potential of the SCR 46 goes positive as aforesaid it causes current to flow through a diode 86 and through resistors 88 and 90 in the buffer circuit. This in turn causes another SCR 92 also in the buffer circuit 78 to go into a conducting state. While the SCR 92 is conducting, a capacitor 94 is charged through a resistor 96 and through the conducting SCR 92. Thereafter, when the SCR 46 conducts, the capacitor 94 discharges through a circuit which includes a diode 98 and the SCR 46 and in so doing places a negative potential on the anode of SCR 92. This causes the SCR 92 to change from its conducting to a non-conducting state. The voltage on the anode of SCR 92 therefore also alternates between a zero voltage condition and a relatively high voltage condition at the same rate as the anode voltage on the SCR 46. The square wave voltage thus produced at the anode of the SCR 92 is connected to the connector F where it is fed to each alarm drawer under control of the flash circuit. When a buffer circuit such as the circuit shown in block 78 is employed the potentiometer 54 controls the flasher "on" time, and the potentiometer 66 controls the flasher "off" time which is the reverse of the condition when a buffer circuit is not employed.

The circuit shown in FIG. 3 also includes an audio portion 100 which controls the audible device 30. The audio circuit energizes the audible device 30 whenever any device being controlled or monitored goes into an alarm condition and causes its associated light to flash. When an alarm condition exists a negative pulse is produced at connection A and causes current to flow through a resistor 102 and a diode 104. This causes the cathode of another SCR 106 to go negative with respect to common. Furthermore, since the gate of the SCR 106 is connected to common through a resistor 108 and a parallel connected capacitor 110, the gate becomes positive with respect to the cathode causing the SCR 106 to conduct to energize the audible device or buzzer 30 which is connected between the connections H and K. As long as the SCR 106 is conducting the audio device 30 will remain energized and a capacitor 112 will be charged through a circuit which includes resistor 114, the SCR 106 and a diode 116. Under these conditions the audible device 30 is producing an easily recognizable audible signal and at the same time one or more of the lamps 38 is flashing on and off providing a dual indication of the alarm condition. This condition will continue until the operator presses the acknowledge switch 26 to stabilize the alarm condition by retaining the particular lamp or lamps in an energized but non-flashing condition to indicate where the trouble is. In the acknowledged condition the audible device is inoperative.

When the operator actuates the acknowledge switch 26, connection R goes positive (FIG. 2) and produces a positive voltage on the anode of another SCR 118 causing it to conduct. The positive voltage is applied to the gate of the SCR 118 across a voltage divider circuit which includes resistors 117 and 119. As soon as the SCR 118 conducts it establishes a circuit which discharges the capacitor 112 thereby placing a negative potential on the anode of the SCR 106 causing it to go from its conducting to a non-conducting state and at the same time deenergizes the audible device 30. The diode 116 in the cathode circuit of the SCR 106 is provided to allow the cathode to go negative with respect to common during an alarm condition. It also allows forward conduction of current through the SCR 106. Another diode 120 is connected between the connections K and H and serves as a freewheeling diode across any device such as the audible device 30 which is connected therebetween.

If the audible device 30 is of an interrupting type the current through the SCR 106 may be momentarily cut off at times and might cause the SCR 106 to stop conducting. Under this condition, the audible device 30 may also be deenergized before the acknowledge switch 26 is actuated. To overcome this, the circuit of the SCR 106 may be provided with an optional resistor 122 connected between the gate electrode of the SCR 106 and the anode electrode of the SCR 118. If this is done then the resistance of the resistor 114 should probably be reduced so that the SCR 118 will remain in latched or conducting condition after the acknowledgement switch 26 is actuated. This means that when an alarm condition occurs and causes the SCR 106 to conduct and cuts off the SCR 118, current will still be allowed to flow through the resistor 122 to keep the SCR 106 conducting even though the anode current of the SCR 106 is interrupted. Thereafter, when the acknowledge switch 26 is actuated current will no longer flow through the resistor 122 since the anode of the SCR 118 is then at or near zero voltage.

If the interrupting type audible device is not used the resistor 114 should be selected to have a high enough resistance to prevent the SCR 118 from latching in conducting condition when the acknowledge switch is actuated. This obviates the relatively unlikely possibility of an alarm occurring when the acknowledge switch is in a depressed condition which otherwise would cause both of the SCR's 106 and 118 to conduct simultaneously. If such a situation occurred, power would have to be momentarily removed in order to deenergize the audible device 30. However, if the resistance of the resistor 114 is high enough to prevent the SCR 118 from latching, the audible device may be silenced even though an alarm occurred while the acknowledge switch 26 is being depressed. It is possible using the circuit shown in FIG. 3 to have one or more circuit conditions connected to operate each of the flasher units. It is also possible to have a separate audible device for each alarm condition or to have a single audible device which operates in conjunction with all of the flasher circuits. Many other variations and changes can also be made in the circuit shown in FIG. 3 without changing the basic idea thereof.

FIG. 4 shows the details of a preferred form of the circuit 34, and includes connections suitably identified by letters corresponding to similar connections in FIGS. 2 and 3. Power is supplied to the circuit 34 at connections H and N, and during normal operation of the circuit 34, which is the condition when no alarm has been sensed, SCR 130 is in a conducting condition, and capacitor 132 is charged through a circuit which includes resistor 134 and the SCR 130. When an alarm condition is sensed by the closing of the sensing contacts 136 which are connected between the connections C and S, the capacitor 132 discharges through a circuit which includes the sensing contacts 136 and a diode 138. This places a negative potential on the anode of the SCR 130 and causes the SCR 130 to go into a non-conducting state. When this happens the anode of the SCR 130 goes positive and reverse biases another diode 140 which causes the junction between the resistors 142 and 144 to go positive. This in turn causes a positive voltage to be fed through the resistor 144 and through another resistor 146 to the gate electrode of SCR 148 causing it to conduct. One or more of the flasher lamps 38 are connected in the anode circuit of the SCR 148, and these are energized when the SCR 148 conducts. It is desired, however, that when the sensing contacts 136 close and before the acknowledge switch 26 is actuated, that the indicator lamps flash "on" or "off" rather than remain in a steady "on" condition. Therefore, when an alarm condition occurs causing the SCR 148 to conduct as already stated, the connection between the resistors 142 and 144 goes positive and charges a capacitor 150 through a circuit which includes the resistor 144, the SCR 148 which is now conducting, and a diode 152. If it is assumed that the flash connection F is positive at a particular instant as explained above in connection with FIG. 3, then at that instant another diode 154 connected to the connection F will be reverse biased, and will have no effect upon the charging of the capacitor 150. However, when the voltage on the connection F goes to zero potential as a result of the square wave which is impressed thereon from the circuit of FIG. 3, the capacitor 150 will discharge through a circuit which includes the diode 154, the diode 84 and the SCR 46 (FIG. 3). This will cause a negative potential to occur on the anode of the SCR 148 causing it to go into a non-conducting condition deenergizing the lamps 38. During the time that the connection F is at or near zero potential, the diode 154 clamps the junction between the resistors 144 and 146 to common thereby preventing current flow through the resistor 146, and prevents the SCR 148 from turning on. Thereafter, when the connection F again goes positive it will again reverse bias the diode 154, thereby again also allowing the junction between the resistors 144 and 146 to go positive to apply a positive voltage to the gate electrode of the SCR 148 to cause it to go into a conducting condition to again turn on the lamps 38. The capacitor 150 will then again charge and the process will repeat itself as long as the annunciator is in an alarm condition and the acknowledge switch 26 has not been actuated. The lamps 38 will flash at a rate determined by the flasher circuit described above in FIG. 3. In actual tests, as noted above, it has been found that a flashing rate of approximately 90 flashes per minute produces an easily recognizable warning.

After the operator has been alerted to an alarm condition he will usually actuate the acknowledge switch 26 thereby establishing a connection between the connection H and the connection R. This connects positive voltage through a resistor 156 on the gate electrode of the SCR 130 causing it to go into a conducting condition. At this time with the acknowledge switch actuated, the circuit is in a pending condition which has the effect of terminating the flashing condition and causing the lamps 38 to remain energized in a steady condition to indicate the location of the fault that produced the alarm. It is only necessary to press the acknowledge switch 26 for a very short time to acknowledge the alarm. When the SCR 130 conducts after an acknowledgement the junction between the resistors 144 and 142 is connected to common through the diode 140 and the SCR 130. Since the lamps 38, prior to acknowledgement, are in a flashing condition two possible conditions might exist at the time the acknowledge switch is pressed, one being that the lamps 38 are energized and the other that the lamps are deenergized.

If the acknowledge switch 26 is pressed when the lamps 38 are in the energized condition, then the junction between the resistors 142 and 144 will drop to zero voltage thereby removing the charging voltage on the capacitor 150. Thereafter, when the connection F again goes to zero potential no charge will be on the capacitor 150 to cause the SCR 148 to be cut off. Therefore, the SCR 148 will remain conducting and the lamps 38 will remain energized which is the precise condition desired after acknowledgement.

On the other hand, if the acknowledge switch 26 is actuated when the lamps 38 are deenergized, then the junction between the resistors 142 and 144 will drop to near zero voltage removing the charging voltage from the capacitor 150. This will prevent the flash connection F from turning off the SCR 148 after it starts it next conducting cycle. Means must also be provided to cause the SCR 148 to again conduct after acknowledgement in order to reenergize the lamps 38. This is accomplished by a circuit which includes a capacitor 158 and parallel connected diode 152 and resistor 160. Prior to acknowledgement, the capacitor 158 is charged by a circuit which includes resistor 162 and the diode 152. After acknowledgement, when the SCR 130 conducts the capacitor 158 is discharged through a circuit which includes the SCR 130 and the resistor 160. This causes a voltage to develop across the resistor 160. The gate electrode of the SCR 148 is connected in series with another resistor 165 and the combination thereof is in parallel with the resistor 160 so that current will now flow through the gate electrode of the SCR 148 causing it to conduct and reenergize the lamps 38. This is the desired condition as aforesaid. The SCR 148 will now remain conducting since the capacitor 150 can no longer be charged to cut it off.

If the circuit is not acknowledged after an alarm is sensed it will stay in the flashing condition. Once it is acknowledged, however, the lamps 38 will remain in a steady "on" condition until the difficulty is corrected or the condition which caused the alarm no longer exists, as will be explained.

During normal operation, the SCR 130 is conducting and the capacitor 132 is charged through a circuit which includes the resistor 134 and the SCR 130. When the sensing contacts 136 close, during an alarm condition, capacitor 132 discharges across the SCR 130 through the diode 138 and the sensing contacts. This places a negative potential on the anode of the SCR 130 and causes it to stop conducting. When the SCR 130 stops conducting, its anode goes positive and this positive voltage is fed to the gate of the SCR 148 through a circuit which includes the resistors 144 and 146. SCR 148 is then turned on and this energizes the lamps 38. The response time required for this operation is preferably in a range from approximately 30 to 50 microseconds.

The diode 138 will prevent any positive voltage on the sensing contact leads from entering the circuit and this will make the circuit immune to all positive transients. Another diode 163 acts as a short circuit to any negative spikes that may occur on the S connection lead. It can therefore be seen that external voltages will not initiate an alarm. In order to initiate an alarm the capacitor 132 must be discharged across the sensing contacts and the stored charge on the capacitor 132 also helps to break down any high resistance film that may be present on the sensing contacts 136 caused by long periods of inactivity.

Another diode 157 is connected between the anode of the SCR 130 and the A connection. The diode 157 places a negative impulse on the A connection when any point in the system goes into alarm. While the sensing contacts 136 are closed the capacitor 132 is discharged through a circuit which includes the diode 138, the resistor 102 and the diode 104 (FIG. 3). Thus during an alarm the capacitor 132 places a negative potential on the anode of the SCR 130 to cut it off and a negative potential on the A connection to energize the audible device 30.

Three modes of operation are possible with the subject circuit. These modes depend on the position of a switch 164 which has two alternate operating positions, one labeled "Non-Seal-In" and the other "Seal-In." If the switch 164 is placed in the "Seal-In" position when a momentary or other alarm condition is sensed, the alarm condition will be sealed in and the lamps 38 will flash as explained above and will thereafter go into a steady "on" condition when the acknowledge switch 26 is actuated. Under these conditions the lamps 38 can be reset to restore the circuit to its normal operating condition only by actuating the reset switch 28. It should be noted that when the switch 164 is in the "Seal-In" position a capacitor 166 will charge through a circuit which includes resistor 168. To reset the circuit after the sensing contacts 136 have opened, the reset switch 28 is actuated to establish a connection between the connections J and F so that when the flashing connection F goes to zero potential, the capacitor 166 will discharge through a circuit which includes a diode 170, the diode 84 and the conducting SCR 46. This causes a negative potential to be on the anode of the SCR 148 causing it to go into a non-conducting state to turn off the lamps 38. The circuit is now returned to its normal operating condition ready to sense the next alarm condition.

In the circuit embodiment shown, the reset switch 28 is connected between the connections J and F. It is also possible to connect the reset switch 28 between the connections J and N, but if this is done there is a possibility that if the switch 28 is released too quickly a fast voltage change might set up which would switch the SCR 148 back into a conducting condition. This would result in faulty operation. This condition cannot occur, however, when the reset switch 28 is connected between the connections J and F because under this condition the lamps 38 are not reset until after the connection F goes to its zero potential. The subject circuit also includes another diode 172 which is used to clamp the junction between the resistor 168 and the capacitor 166 to common in the event the sensing contacts 136 should remain closed. This is done to prevent resetting the lamps 38 while the sensing contacts are still in their closed or alarm condition.

A second mode of operation occurs when the switch 164 is in the "Non-Seal-In" position. In this position a circuit which includes a diode 174 and a resistor 176 is disconnected so that when the sensing contacts 136 close, the lamps 38 will flash and then go to a steady energized condition when the acknowledge switch 26 is actuated. Thereafter, when the sensing contacts again open the lamps 38 will automatically be reset to their normal deenergized condition. To understand this operation, assume that an alarm has been sensed and the acknowledge switch 26 actuated. Under these conditions the junction between the resistor 168 and the capacitor 166 is connected to common through the diode 172 and through the sensing contacts 136. Now, when the sensing contacts 136 open, the capacitor 166 will charge through 168, 148 and 152. Thereafter, when the potential on connection F goes to zero the capacitor 166 will discharge through a circuit which includes the switch 164, another diode 178, the diode 84 and the SCR 46. When this happens, a negative potential is placed on the anode of the SCR 148 causing it to go into a non-conducting condition to reset the circuit to its normal operating condition. Under the conditions just described, actuating the reset switch 28 will have no effect since the capacitor 166 is discharged during the acknowledge condition. As a matter of fact, if all of the annunciator circuits are operated when the switch 164 is in the "Non-Seal-In" position no reset switch would be required. Furthermore, if the sensing contacts 136 only momentarily close the lamps 38 will flash until acknowledged and then will automatically return to normal. This is because when the acknowledge switch 26 is actuated the capacitor 166 charges through the resistor 168 since at that time the junction between the resistor 168 and the capacitor 166 is no longer connected to common through the diode 172 which is in series with the sensing contacts 136. When the capacitor 166 charges and the flashing connection F goes to zero voltage, the capacitor 166 will discharge through the circuit which includes the switch 164, the diode 178, the diode 84 and the SCR 46, as aforesaid. Discharging the capacitor 166 turns off the SCR 148 and resets the lamps 38 to their normal deenergized condition.

The third operating mode of the circuit occurs when the switch 164 is in the "Non-Seal-In" position and the diode 174 and the resistor 176 are connected into the circuit as shown. Under these conditions when the sensing contacts 136 close, the indicator lamps 38 will flash only and will go to a steady energized condition when acknowledge switch 26 is actuated. Thereafter, if the sensing contacts 136 should open, the lamps 38 will automatically be reset to their normal operating condition. The operation of the circuit under these conditions is similar to that described above for the second mode of operation.

If the sensing contacts under the third operating mode momentarily close then the lamps 38 will flash only until the sensing contacts again open. This is accomplished by the circuit which includes the diode 174 and the resistor 176 which provides means for automatically acknowledging the presence of an alarm condition as soon as the sensing contacts 136 open. Under these conditions the lamps 38 are automatically reset. The operation under these conditions is as follows: when the sensing contacts 136 close the lamps 38 will begin to flash and the diode 172 will clamp the junction between the resistor 168 and the capacitor 166 to common through the sensing contacts 136. Thereafter, when the sensing contacts again open, the junction between the resistor 168 and the capacitor 166 will go positive since it is no longer connected to common through the diode 172 and the sensing contacts 136, and this positive voltage will be applied to the gate terminal of the SCR 130 through the switch 164, the resistor 176 and the diode 174 causing the SCR 130 to conduct. This causes the junction between the resistors 142 and 144 to go to zero preventing the SCR 148 from again being turned on. This occurs as soon as the sensing contacts open because at that time the capacitor 166, which had previously been charged through the resistor 168, discharges through the flasher circuit.

It is now apparent that there has been described in connection with FIG. 4 a novel circuit which is immune from being effected by transient conditions and at the same time operates in conjunction with other circuits shown in FIGS. 2 and 3 to produce an annunciator which can be used to simultaneously monitor any number of different conditions. The subject circuit can also produce various combinations of warnings and warning conditions. Furthermore, many changes and variations can be made in the subject circuit without changing the basic operating characteristics and structural details. For example, the lamps and audible devices can be located remotely from the annunciator circuits or in a common control panel, and various other control and warning devices can be used to provide the warning conditions.

Although not essential, the use of the SCR's in the subject circuit is preferred because SCR's are reliable and are available in many different current carrying capacities. As already noted, the "Seal-In" and "Non-Seal-In" switch 164 can also be provided or omitted as desired. The subject annunciator can also be made to operate on many different voltages and on AC as well as DC power. The subject annunciator can also be used to monitor almost any condition including temperature, pressure, electrical or mechanical controls, radiation, and many other devices and conditions and can be constructed to be immune from transient conditions which cause false alarms and unnecessary maintenance and down time. It is preferable to construct the subject circuit using solid state devices as far as possible in order to reduce the current and load requirements and to make it compact and lightweight. The device can also be modified to provide visual and/or audible warnings, and it can be modified to provide separate means to acknowledge each condition being monitored. It is also possible to provide means for separately acknowledging the visual and audible alarms. Likewise a separate reset switch can be provided for individual circuits as desired. The circuit can be further modified to include normally closed as well as normally open sensing contacts.

The subject circuit also includes the test switch 28 which when actuated simulates an alarm condition in all or in a predetermined number of positions for test purposes. Operation of the test switch 28 connects a test diode 180 (FIG. 4) in the circuit in parallel with the sensing contacts 136 to produce an alarm condition for test purposes.

Thus there has been shown and described a novel annunciator device and circuit which fulfills all of the objects and advantages sought therefor. As already indicated many changes, variations, modifications and other uses and applications for the subject device will become apparent to those skilled in the art after considering this specification and the accompanying drawings. All such changes, variations, modifications and other uses and applications which do not depart from the spirit and scope of the invention are deemed to be covered by the invention which is limited only by the claims which follow.

What is claimed is:

1. Annunciator means for monitoring conditions comprising a condition responsive switch device positioned to respond to a condition being monitored, said switch device going from an inoperative monitoring condition to an operative condition in response to the occurrence of a predetermined state of the condition being monitored, circuit means including a bi-stable circuit connected to be triggered by the switch device when ever said switch device goes to its operative condition, said bi-stable circuit having a first controllable rectifier element normally in a conducting condition, a second controllable rectifier element normally in a non-conducting condition, and means for storing a charge, an alarm device connected in the circuit of said second rectifier element to be energized whenever said second element conducts, occurrences of the operating condition of said switch device dissipating the charge stored on the charge storage means and producing signals which trigger the bi-stable circuit and cause the conducting conditions of said first and second rectifier elements to reverse, means for thereafter alternately reversing the conducting conditions of the said first and second elements to alternately energize and deenergize the alarm device, means to control the time duration that the alarm device is deenergized between succeeding energizations thereof, means actuable to cause the alarm device to remain continuously energized after the condition responsive switch device has gone from its inoperative to its operative condition, and other means to restore the circuit to its initial monitoring condition.

2. The annunciator means defined in claim 1 including a unidirectional current flow device connected in the circuit between the condition responsive switch device and the bi-stable circuit.

3. The annunciator means defined in claim 1 including first and second unidirectional current flow devices connected in the circuit between the switch means and the bi-stable circuit, said first device being connected to prevent positive going transient signals from triggering the bi-stable circuit, and said second device being connected to prevent negative going transient signals from triggering the bi-stable circuit.

4. The annunciator means defined in claim 1 wherein said bi-stable circuit includes a device having a charge stored thereon during inoperative monitoring condition of the switch device, the charge on said device discharging through the switch device when the switch device goes to its operative condition.

5. The annunciator means defined in claim 1 including a plurality of condition responsive switch devices to monitor a plurality of corresponding conditions, and a bi-stable circuit and associated alarm device connected to be controlled by each of said switch devices.

6. Means for monitoring a variable condition including means to provide a warning when a predetermined state of a condition exists comprising means responsive to the state of a condition being monitored including switch means movable from a deactuated condition to an actuated condition in response to the occurrence of a predetermined state of the condition being monitored, circuit means connected to said switch means including means energized in response to the occurrence of said predetermined condition, said circuit means including a flip-flop circuit having a pair of controllable rectifier devices connected therein, one of said rectifier devices being in a normally conducting condition and the other in a normally non-conducting condition, said switch means causing a reversal in the conducting conditions of said rectifier devices whenever the predetermined state of the condition being monitored occurs, said circuit means including an indicating device operatively connected to said flip-flop circuit for producing an alarm whenever the rectifier devices in the flip-flop circuit go from one condition to another as a result of the switch means being actuated, means connected in the circuit between the switch means and the flip-flop circuit including at least one unidirectional current flow device connected to prevent transient circuit conditions from reversing the conducting conditions of the rectifier devices, other circuit means energizable to terminate an alarm condition and to simultaneously retain a remembrance of the occurrence thereof, and means to reset the circuit means to an initial monitoring condition.

References Cited

UNITED STATES PATENTS

| | | | |
|---|---|---|---|
| 3,051,852 | 8/1962 | Mintz | 340—213.1 |
| 3,128,456 | 4/1964 | Silliman | 340—213.1 |
| 3,136,982 | 6/1964 | Sargent | 340—213.1 |
| 3,212,079 | 10/1965 | Huttner | 340—213.1 |
| 3,264,626 | 8/1966 | Mounce | 340—213.1 |

THOMAS B. HABECKER, Primary Examiner

U.S. Cl. X.R.

307—284, 292; 320—1; 340—244